G. W. PLEIS.
SEPARATOR FOR STORAGE BATTERY PLATES.
APPLICATION FILED JULY 23, 1919.
1,362,737.
Patented Dec. 21, 1920.
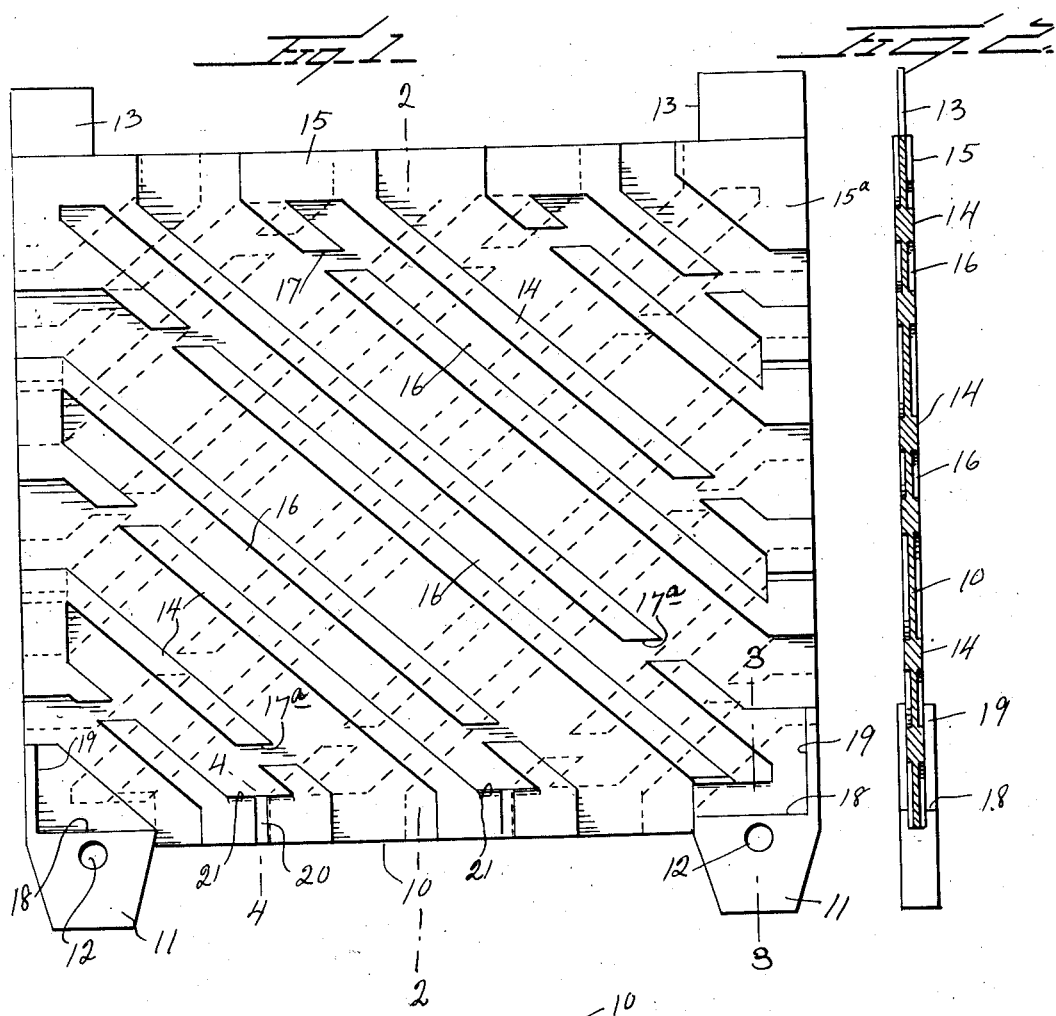
Inventor
G. W. Pleis
By Watson E. Coleman
Attorney

UNITED STATES PATENT OFFICE.

GEORGE W. PLEIS, OF PHILADELPHIA, PENNSYLVANIA.

SEPARATOR FOR STORAGE-BATTERY PLATES.

1,362,737.     Specification of Letters Patent.     Patented Dec. 21, 1920.

Application filed July 23, 1919. Serial No. 312,658.

*To all whom it may concern:*

Be it known that I, GEORGE W. PLEIS, a citizen of the United States, residing at Philadelphia, in the county of Philadelphia and State of Pennsylvania, have invented certain new and useful Improvements in Separators for Storage-Battery Plates, of which the following is a specification, reference being had to the accompanying drawings.

This invention relates to storage batteries, and particularly to the separator used between the grids of a storage battery.

In all storage batteries, the battery plates are held spaced apart by separators which are of wood, composition, hard fiber, rubber, and a variety of other compositions.

In storage batteries, the positive elements are made of materials of such character that the grid is very liable to warp, disintegrate and get out of shape, and it is particularly necessary that the grid should be held positively from any warping action and as far as possible disintegration prevented.

The general object of my invention is to provide a separator which may be cheaply made of fibrous material, composition, or other suitable material, which is relatively thin but which is relatively strong.

And a further object is to provide a separator so constructed that the grid or battery plate is firmly supported over nearly its entire surface, and particularly at the margins of the grid so that the plate or grid can not warp or get out of shape.

A further object is to provide a separator so formed as to provide angular ledges or pockets within which the lower corners of the grid are received, these ledges acting to hold the grid firmly in position without any bolts or other members passing through the grid, and which will prevent the grid from shifting so that its margins will extend beyond the separator and tend to short circuit.

A further object is to form the grid on its opposite faces with a plurality of ribs extending out from the face of the separator, these ribs on one face of the separator being disposed at right angles to the ribs on the opposite face of the separator, these ribs not only acting to support the battery plate or grid in spaced relation to the greater portion of the face of the separator, but also acting, by reason of their extending at right angles to each other, to resist breakage of the ribs and thus make the separator relatively strong though it is relatively light.

A further object is to so form the separator that it may be supported in conjunction with other separators by means of transversely extending bolts, which bolts are so disposed that if by any chance a battery plate should slip off or out of the ledges upon which it rests, it will be supported by these transverse bolts and supported in spaced relation to the lower edges of the separators so as to prevent the battery plate or grid from extending below the lower edges of the separators and thus short circuiting.

Still another object is to so form the ribs on the faces of the separator as to secure a thoroughly good circulation of the electrolyte, and also so form them that particles of the grid which may become disintegrated may be washed away from between the separator and the face of the grid or plate.

Other objects will appear in the course of the following description.

My invention is illustrated in the accompanying drawings, wherein:—

Figure 1 is a face view of a separator for storage battery plates constructed in accordance with my invention;

Fig. 2 is a vertical section on the line 2—2 of Fig. 1;

Fig. 3 is a vertical section on the line 3—3 of Fig. 1;

Fig. 4 is a section on the line 4—4 of Fig. 1;

Referring to these drawings, it will be seen that my improved separator, designated generally 10, is, generally speaking, rectangular in form, this separator having an area slightly greater than the grid with which it is designed to be used. The separator is formed of any suitable fibrous material and may be made of gutta-percha, hard rubber, wood, hard fiber, etc., and may be either built up of sheets of material or pressed into shape. At its lower corners, the separator is formed to provide the downwardly extending feet 11, which may project below the lower edge of the separator any suitable distance, these feet being relatively thick and being formed with perforations 12 positioned in a manner which will later appear. The upper corners of the separator may be provided with the upwardly projecting ears 13 coinciding with the ears on the battery plates or grids. The opposite faces of the separator are formed to provide a plurality of relatively shallow ribs 14, preferably extending diagonally, and the ribs on one face of the separator are disposed crosswise of the ribs on the other face of the separator, whether these ribs are diagonal transverse, or vertical. Preferably, as before stated, the ribs extend diagonally of the plate.

In order to provide for a firm bearing for the plate or grid against the margins of the separator, I form these margins with relatively long, projecting portions 15, into which the ribs 14 extend or merge, these projecting portions 15 therefore closing the ends of the spaces 16 between each pair of ribs, and in order to provide for free circulation of the electrolyte in these spaces 16, I form one of the ribs 14 of each pair with a groove 17 adjacent the upper end of the rib and the other rib of the pair with a groove 17ª adjacent the lower end of the rib. The diagonal ribs 14 may either merge into or be separate from the marginal rib portions 15. Thus, the electrolyte may flow freely into the spaces 16 bounded by the ribs and elevations 15 and flow out, and this flow of material acts to wash away any particles of the grid which, through disintegration or otherwise, are washed or become detached from the grid and would otherwise tend to accumulate within the spaces 16. Relatively wide triangular elevations 15ª are also formed at the upper corners of the separator.

In order to support the grid from any downward movement and hold it firmly in place against the separator with the margins of the grid in spaced relation to the margins of the separator, I form an angular ledge or shoulder 18 at the lower corner of the separator, this ledge being formed by a relatively thick vertical rib 19 extending upward from the foot 14, the upper edge of the foot 11 forming the horizontal portion of the shoulder 18. This horizontal portion of the shoulder 18 is disposed above the lower edge of the separator, and the vertical shoulder formed by the inner edge of the rib 19 is disposed inward of the outer edge or margin of the separator. Thus, a grid disposed in this angular pocket formed by the shoulders 18 and 19 will be firmly supported against downward movement and against lateral movement and will be centered, so to speak, with relation to the separator.

It is to be particularly noted that the perforations 12 in the feet are disposed at such a slight distance below the shoulder 18 that if by any chance a plate should slip off this shoulder 19, it would rest upon the bolts passing through the perforations 12 and that these bolts would support the grid with its lower edge above the lower edge of the separator, thus preventing any short circuiting, which would occur if the margins of the grids should slip beyond the margins of the separator.

The lower ends of the channels 16 or spaces formed between the ribs 14 are blocked by the transversely extending, elevated portions of the ribs 15, and thus these channels might form pockets at their lower ends in which particles of the grid, disengaged from the face thereof, might collect, thus preventing the proper functioning of the battery. In order to prevent this, the portions 15 at the lower ends of the channels 16 may be provided with a slight and relatively shallow groove 20, these grooves being relatively narrow so as not to materially affect the area of the portions 14 supporting the margin of the grid, and preferably the inner edge of each portion 15 is rounded, as at 21, to permit the passage of these particles from the channels 16.

It will be seen that with a separator of this construction, the battery plates are firmly supported over a very large extent of surface without, however, preventing the free circulation of electrolyte around the battery plates, and that particularly all four of the margins of the grid or battery plate are supported so that thus the battery plate cannot become warped or get out of shape, inasmuch as it is held securely pressed between two of the separators, which separators are clamped firmly together by the bolts passing through the apertures 12. Furthermore, it will be seen that each grid is supported and centered by the shoulders 18 and 19 so that it cannot slip out of place, and that if by any chance the separators were spread sufficiently as to permit a plate to slip downward, it would only slip downward onto the bolts which pass through the apertures 12, and that these bolts would still hold the plate from falling to a position where it would project below the pair of separators inclosing them.

Furthermore, it will be seen that the shoulders 19 hold the grid from lateral movement. The separator, as before explained, is strengthened by the ribs which run across its face, thus permitting the separator to be made of relatively thin material and economizing space therefore, and furthermore inasmuch as the ribs on one face extend crosswise to the ribs on the other face, these ribs will extend diagonally across the separator in all directions so that any bending strain on the separator will be resisted by the ribs. An attempt to bend the separator parallel to one set of ribs will be resisted by the ribs on the other face of the plate extending transversely to this bend. An attempt to bend the plate on a vertical line would be resisted by both sets of ribs, and the same is true of any attempt to bend the plate on a horizontal line. My separator may be very cheaply made, is very light, economizes space, and permits a set of battery plates to be readily lifted out of the cell or disposed therein as a unit.

While I have illustrated a particular form of my invention, I do not wish to be limited thereto, as it is obvious that the principle of the invention might be embodied in other forms.

Attention is particularly called to the protection which this separator gives to the battery plate or grid. It is so constructed that it prevents the corners of the plate or grid from warping, prevents the center of the plate from buckling, protects all four edges or margins of the plate and holds the plate securely around its margins without, however, preventing a good circulation of the electrolyte around the plate. Furthermore, this separator keeps the paste on the plate from falling off. Again, the separator is so constructed as to prevent the collection of sediment in the spaces 16.

I claim:—

1. A separator for storage battery grids consisting of a relatively thin sheet of non-conductive material embossed on its opposite faces.

2. A separator for storage battery grids consisting of a relatively thin sheet of non-conductive material having relatively shallow ribs on its opposite faces.

3. A separator for storage battery grids consisting of a relatively thin sheet of non-conductive material having relatively shallow, parallel ribs on opposite faces, the ribs on one face extending in diagonal relation to the ribs on the opposite face.

4. A separator for storage battery grids consisting of a relatively thin sheet of non-conductive material having relatively shallow, parallel ribs on opposite faces, the ribs on one face extending in diagonal relation to the ribs on the opposite face, the ribs having grooves extending transversely across the ribs.

5. A separator for storage battery grids consisting of a relatively thin sheet of non-conductive material, rectangular in form, and having ribs disposed at intervals at the margins of the sheet.

6. A separator for storage battery grids consisting of a relatively thin sheet of non-conductive material, rectangular in form, and having spaced ribs extending along the margins of the sheet and parallel thereto.

7. A separator for storage battery grids consisting of a relatively thin, rectangular sheet of non-conductive material having ribs extending along the margins of the sheet and parallel to said margins, and diagonal ribs extending across the sheet.

8. A separator for storage battery grids consisting of a relatively thin, rectangular sheet of non-conductive material having ribs extending along the margins of the sheet and parallel thereto and having diagonal ribs extending across the sheet and arranged in pairs and intersecting the ends of the marginal ribs, the diagonal ribs being grooved.

9. A separator for storage battery grids consisting of a relatively thin, rectangular sheet of non-conductive material having ribs extending along the margins of the sheet and parallel thereto and having diagonal ribs extending across the sheet and arranged in pairs and intersecting the ends of the marginal ribs, each pair of diagonal ribs having one of the ribs of the pair transversely grooved at one end and the other rib of the pair transversely grooved at the opposite end, whereby to drain the space between said ribs.

10. A separator for storage battery grids consisting of a relatively thin, rectangular sheet of non-conductive material formed to provide ribs on both faces disposed at intervals along the margins of the sheet and parallel thereto and having on both faces pairs of diagonal ribs, each pair of diagonal ribs intersecting the ends of two marginal ribs, said diagonal ribs being transversely grooved at intervals to provide for straining the space between each pair of ribs, the diagonal ribs on one side of the sheet extending at right angles to the diagonal ribs on the other side of the sheet.

11. A separator for storage battery grids consisting of a rectangular sheet of relatively thin non-conductive material having projecting portions on its opposite faces and formed with right angular shoulders at its lower corners to engage and support the corners of a grid and center the grid.

12. A separator for storage battery grids consisting of a relatively thin, rectangular sheet of non-conductive material embossed on its opposite faces and having feet extending downward from the lower corners of the sheet, said feet being apertured for the passage of a bolt.

13. A separator for storage battery grids consisting of a relatively thin, rectangular sheet of non-conductive material embossed on its opposite faces and having feet extending downward from the lower corners of the sheet, said feet being apertured for the passage of a bolt, the apertures being disposed so that the upper portions of the apertures are slightly above the lower edge of the sheet.

14. A separator for storage battery grids consisting of a relatively thin sheet of material having a series of parallel, diagonally disposed ribs on its opposite faces, the lower corners of the sheet on each face being formed with right angular shoulders to engage and support the corners of a grid and center the same, the lower corners of the sheet being also formed with downwardly projecting feet disposed below the shoulders, the feet being apertured for the passage of bolts, the aperture of each foot being disposed with its upper portion slightly above the lower edge of the sheet.

15. As an article of manufacture, a separator for storage battery grids consisting of a relatively thin sheet of insulating material embossed on its opposite faces to form a plurality of shallow projections arranged to permit a circulation of electrolyte over the face of the coacting battery plate.

16. A separator for storage battery grids consisting of a relatively thin, rectangular sheet of non-conductive material embossed on its opposite faces to provide a series of pairs of downwardly extending, parallel ribs, the ends of the ribs being connected by ribs extending parallel to the margins of the sheet, the faces of said last named ribs at the lower ends of the pairs of ribs being vertically grooved to the lower end of the sheet to provide for the discharge of particles deposited between said pairs of ribs.

In testimony whereof I hereunto affix my signature.

GEORGE W. PLEIS.